United States Patent
Vetter et al.

(10) Patent No.: US 9,897,072 B2
(45) Date of Patent: Feb. 20, 2018

(54) METHOD FOR THE OPERATION OF A PITCH SYSTEM OF A WIND TURBINE

(71) Applicant: Moog Unna GmbH, Unna (DE)

(72) Inventors: Alf Vetter, Rinkerode (DE); Matthias Pauli, Bad Wunneberg (DE)

(73) Assignee: Moog Unna GmbH, Unna (DE)

( * ) Notice: Subject to any disclaimer, the term of this patent is extended or adjusted under 35 U.S.C. 154(b) by 311 days.

(21) Appl. No.: 14/543,373

(22) Filed: Nov. 17, 2014

(65) Prior Publication Data

US 2015/0152843 A1  Jun. 4, 2015

(30) Foreign Application Priority Data

Dec. 2, 2013 (EP) ..................... 13195270

(51) Int. Cl.
*F03D 7/02* (2006.01)
*H02J 9/06* (2006.01)

(52) U.S. Cl.
CPC ......... *F03D 7/0224* (2013.01); *F03D 7/0264* (2013.01); *H02J 9/062* (2013.01); *F05B 2260/79* (2013.01); *F05B 2270/107* (2013.01); *F05B 2270/602* (2013.01); *Y02B 10/72* (2013.01); *Y02E 10/723* (2013.01); *Y02E 10/766* (2013.01)

(58) Field of Classification Search
CPC ............... F03D 7/0224; F03D 7/0264; F05B 2270/107; F05B 2270/602; H02J 9/062; Y02E 10/723; Y02E 10/766; Y02B 10/72
See application file for complete search history.

(56) References Cited

U.S. PATENT DOCUMENTS 7,514,907 B2 *  4/2009  Rajda ..................... F03D 9/005
                                                       323/205
8,284,532 B2 * 10/2012  Yu ........................... H02H 9/04
                                                       361/91.1
(Continued)

FOREIGN PATENT DOCUMENTS

DE       10335575 A1 *  3/2005  ........... F03D 7/0224
EP        2418380 A1 *  2/2012  ........... F03D 7/0224
(Continued)

OTHER PUBLICATIONS

Machine Translation of DE 10335575 [retrieved on Nov. 8, 2016]. Retrieved from: Espacenet.*
(Continued)

*Primary Examiner* — Woody Lee, Jr.
*Assistant Examiner* — Eric Zamora Alvarez
(74) *Attorney, Agent, or Firm* — Harter Secrest & Emery LLP

(57) ABSTRACT

A method for the operation of a pitch system of a wind turbine with at least one rotor blade, wherein the pitch system has at least one input rectifier and at least one pitch drive, each rotor blade can be rotated around its longitudinal axis by the one pitch drive or by at least one of several pitch drives, each input rectifier is supplied with alternating voltage by a supply network, and each pitch drive is supplied with electric power by the one input rectifier or by at least one of several input rectifiers, each pitch drive is connected to an emergency power storage device, whereby each pitch drive can be supplied with electric power by the emergency power storage device that is connected to it.

18 Claims, 2 Drawing Sheets

(56) References Cited

U.S. PATENT DOCUMENTS

| | | | |
|---|---|---|---|
| 8,405,237 B2 * | 3/2013 | Warfen | F03D 7/0224 290/44 |
| 2006/0267560 A1 * | 11/2006 | Rajda | F03D 9/005 323/209 |
| 2009/0001726 A1 * | 1/2009 | Warfen | F03D 7/0224 290/44 |
| 2010/0327599 A1 | 12/2010 | Nielsen et al. | |
| 2012/0087792 A1 * | 4/2012 | Cousineau | F03D 7/0224 416/1 |
| 2013/0020804 A1 * | 1/2013 | Roesmann | F03B 15/00 290/44 |
| 2013/0271056 A1 * | 10/2013 | Bunte | F03D 7/0224 318/503 |
| 2013/0313826 A1 * | 11/2013 | Gupta | H02H 7/065 290/44 |

FOREIGN PATENT DOCUMENTS

| | | | |
|---|---|---|---|
| EP | 2637300 A1 | 9/2013 | |
| WO | WO 2012055416 A1 * | 5/2012 | H02H 7/065 |
| WO | WO 2012059368 A2 * | 5/2012 | F03D 7/0224 |
| WO | WO 2012076015 A2 * | 6/2012 | F03D 9/003 |

OTHER PUBLICATIONS

European Patent Office Search Report (7 pages), dated Apr. 30, 2014.

* cited by examiner

METHOD FOR THE OPERATION OF A PITCH SYSTEM OF A WIND TURBINE

TECHNICAL FIELD

The invention relates to a method for the operation of a pitch system of a wind turbine with at least one rotor blade.

BACKGROUND ART

Modern wind turbines are generally equipped with electric pitch systems that have at least one pitch drive. In most cases, at least one pitch drive is provided for each rotor blade. As the rotor blades rotate around their longitudinal axis, such pitch systems regulate the position of the rotor blades relative to the wind, and they are often the only reliable way to bring the rotor of a wind turbine to a standstill. This is done in that the pitch drive or drives turn the rotor blades into the so-called feathering position, bringing the rotor to a standstill since it is no longer driven by the wind. The pitch system is normally supplied with power by the network into which the wind turbine also feeds the power it generates. If the network fails, a hazardous situation can arise, for example, if the rotational speed of the rotor of the wind turbine exceeds the permissible maximum value if the wind picks up, so that the wind turbine could sustain damage or persons present in the vicinity could suffer injury as a result.

In order to avert such a hazardous situation, even if the network fails, it must be possible to move the rotor blades into the feathering position, even when the pitch system is not being supplied with power by the external network. For this purpose, it is known from the state of the art to equip the pitch system with one or more emergency power supply devices that, in case of a network failure, ensure the supply of power to the pitch system and thus the functionality of the pitch system, at least until the rotor blades have been moved into the safe feathering position.

Pitch drives can have, for example, an inverter and an electric pitch motor. Here, the inverter is supplied with electric power by an input rectifier, whereby the inverter operates the pitch motor with this power. Direct-current motors as well as alternating-current motors are options as pitch motors.

Pitch systems known from the state of the art have the drawback that they are sensitive to overvoltages and that they can no longer remain in operation, even if the overvoltages in the supply network are small.

Overvoltages in the supply network can be caused, for instance, by lightning strikes. The voltages to which the pitch system that is to be protected is exposed vary greatly, depending on the point of strike of the lightning and on the way in which the lightning energy enters the supply network. Therefore, the state of the art employs overvoltage protection devices to protect the pitch system already against small overvoltages. Generally known overvoltage protection devices use, for example, varistors, suppressor diodes or gas discharge tubes. As a rule, varistors are used to protect pitch systems.

If, in spite of the presence of overvoltage protection devices, a pitch system is exposed to even just a brief overvoltage, an emergency procedure is immediately initiated for safety reasons, that is to say, all of the rotor blades are turned into the feathering position.

Before this backdrop, the objective of the invention is to put forward a method for the operation of a pitch system of a wind turbine that, even in case of moderate network overvoltages, permits the continued operation of the pitch system.

BRIEF SUMMARY OF THE INVENTION

A method for the operation of a pitch system of a wind turbine with at least one rotor blade is provided, whereby the pitch system has at least one input rectifier and at least one pitch drive, whereby each rotor blade can be rotated around its longitudinal axis by the one pitch drive or by at least one of several pitch drives, each input rectifier is supplied with alternating voltage by a supply network, and each pitch drive is supplied with electric power by the one input rectifier or by at least one of several input rectifiers, each pitch drive is connected to an emergency power storage device, whereby each pitch drive can be supplied with electric power by the emergency power storage device that is connected to it.

The supply network can be, for example, the general power grid or else an internal supply network of a wind turbine that is fed by the generator of the wind turbine itself or by another source of energy such as, for instance, a diesel generator or a photovoltaic installation.

The envisaged objective as defined above is achieved on the basis of the method described above for the operation of a pitch system of a wind turbine in that the pitch system has at least one supply voltage measuring device, each input rectifier has at least one semiconductor switching element with which a flow of current from the supply network into the respective input rectifier can be blocked, whereby each supply voltage measuring device measures the voltage of the supply network and, if the measured voltage of the supply network or a value calculated from several measured voltages exceeds a first voltage value, then each semiconductor switching element blocks the flow of current from the supply network into the respective input rectifier, and each pitch drive is supplied with electric power by the emergency power storage device that is connected to it.

The method according to the invention achieves that the pitch drives are protected against overvoltages in the supply network. This is due to the fact that it has been surprisingly found that, when the semiconductor switching elements are in the blocking mode, they have a higher overvoltage resistance than especially the pitch drives. Consequently, in order to protect the pitch drives, it is sufficient to block the flow of current from the supply network into the input rectifier or rectifiers, in order to protect the other components of the pitch system against the overvoltage in the supply network. Below, the voltage of the supply network can refer to the measured voltage of the supply network as well as to a value calculated from several measured voltages.

According to the invention, the power supply of all of the pitch drives can come from a single emergency power storage device. Within the scope of the invention, however, it is likewise possible to provide one or more emergency power storage devices for each pitch drive.

In order to protect the pitch system against overvoltages that exceed the overvoltage resistance of the semiconductor switching elements or that are faster than the response time of the semiconductor switching elements, it is possible to use overvoltage protection devices of the type known from the state of the art. Such an overvoltage protection device is normally arranged between the supply network and the input rectifier or input rectifiers.

Moreover, it has proven to be advantageous for the overvoltage protection device to have a monitoring module, whereby the monitoring module is able to emit a warning signal and/or an error signal. A warning signal is emitted when the overvoltage protection device has to be replaced within a certain period of time. Replacement of the overvoltage protection device can be necessary, for instance, if the overvoltage protection device can no longer offer reliable protection against overvoltages due to ageing. The period of time within which the overvoltage protection device has to be replaced depends essentially on the ageing status of the overvoltage protection device. Replacement of the overvoltage protection device at regular time intervals, irrespective of a warning signal, can likewise ensure that the overvoltage protection device will always offer adequate protection against overvoltages from the supply network.

An error signal is emitted if the overvoltage protection device has a defect that interferes with its overvoltage protection function. In this case, the error signal can be used to initiate an emergency procedure. Moreover, the error signal can also be used to prevent the pitch system—and thus the entire wind turbine—from being started up again. Consequently, the warning signal and the error signal differ qualitatively. Whereas the pitch system can continue to operate for a brief time in the case of a warning signal, an error signal generally calls for an emergency procedure and stoppage of the wind turbine, since the entire pitch system could fail due to a further overvoltage.

The two above-mentioned signals can especially be of a visual or acoustic nature. It is particularly advantageous for the monitoring module to have at least one—especially digital—output or at least one switching contact for each signal type via which the signals can be output to a superordinated control unit.

According to an advantageous refinement of the invention, it is provided that an emergency procedure is initiated if at least one semiconductor switching element has been switched to the blocking mode for longer than a first time span. Since the power stored in the emergency power storage device or devices is limited, the pitch system cannot be permanently operated with blocking semiconductor switching elements. Therefore, in order to ensure the safety of the wind turbine, an emergency procedure has to be carried out in a timely manner. This can be achieved, for example, using a timer, which measures how long the semiconductor switching element or elements have been switched to the blocking mode and which automatically initiates the emergency procedure if a first time span has been exceeded.

An advantageous embodiment of the invention is characterized in that an emergency procedure is initiated if the measured voltage of the supply network exceeds a second voltage value. Since the protection of the pitch system is limited by the overvoltage resistance of the semiconductor switching element or elements, this achieves that, in case of an overvoltage that reaches this overvoltage resistance or approaches this overvoltage resistance to within a safety margin, the wind turbine is changed over to a safe mode by means of an emergency procedure.

According to an especially advantageous refinement of the invention, it is provided that a mains contactor is arranged in the connection between the supply network and the one or several input rectifiers, whereby each input rectifier is disconnected from the supply network by the mains contactor if the measured voltage of the supply network exceeds a second voltage value. The use of a mains contactor can very effectively protect the pitch system against further overvoltages since the mains contactor device is able to bring about an electrical isolation of the pitch system from the supply network.

In a preferred embodiment of the invention, it is provided that the second voltage value is greater than the first voltage value. In this manner, it is achieved that the mains contactor is only opened once the semiconductor switching element or elements have blocked a flow of current.

According to another preferred embodiment of the invention, it is provided that a mains contactor is arranged in the connection between the supply network and the one or several input rectifiers, whereby each input rectifier is disconnected from the supply network by the mains contactor if at least one semiconductor switching element has been switched to the blocking mode for longer than a first time span. In this manner, the semiconductor switching element or elements are protected against prolonged overvoltages.

Furthermore, it is advantageous for an emergency procedure to be initiated if the power stored in the emergency power storage device or devices falls below a predetermined threshold value. This triggering mechanism of an emergency procedure can always ensure that the power stored in the emergency power storage device or devices will be sufficient to carry out an emergency procedure. For this purpose, all that is necessary is for the power stored in the emergency power storage device or devices to be measured or reliably estimated by suitable means while the semiconductor switching element or elements is/are in the blocking mode. The threshold value here is set at such a level that it amounts to at least the power needed for an emergency procedure.

According to another preferred refinement of the invention, it is provided that each semiconductor switching element deblocks the flow of current into the respective input rectifier if the measured voltage of the supply network falls below a third voltage value. This permits the transition to the normal operation of the pitch system in which the pitch system is once again operated with electric power from the supply network.

In an advantageous embodiment of the invention, it is provided that the third voltage value is equal to or smaller than the first voltage value. In order to prevent the semiconductor switching element or elements from constantly jumping from the deblocked switching status to the blocked switching status, a hysteresis can be introduced in that the third voltage value is selected so as to be smaller than the first voltage value.

According to another advantageous embodiment of the invention, it is provided that the blocking of a flow of current from the supply network into one of the input rectifiers is maintained by a semiconductor switching element at least for the duration of a second time span before deblocking becomes possible. This makes it possible to prevent repeated jumping of the semiconductor switching element or elements from the deblocked switching status to the blocked switching status. In an especially preferred embodiment of the invention, it is provided that the second time span is at least 250 milliseconds, preferably at least 500 milliseconds.

In an advantageous refinement of the invention, it is provided that the pitch system has one—especially digital—signal output by means of which a signal is emitted, whereby this signal indicates the switching status of the mains contactor. This signal can be output, for instance, to a superordinated control unit of the wind turbine.

According to another advantageous refinement of the invention, it is provided that each input rectifier has a supply voltage measuring device. Since the supply voltage measuring device is arranged in the input rectifier, a particularly short signal path exists between the supply voltage measuring device and the semiconductor switching element or elements. Consequently, the delay between the detection of an overvoltage in the supply network and the blocking of the semiconductor switching element or elements is minimal. When several input rectifiers are used, overvoltages in the supply network can be detected very reliably, thanks to the redundancy of the voltage measuring devices, so that even if one of the supply voltage measuring devices fails, the safe operation of the pitch system continues to be possible.

Within the scope of the invention, it has proven to be advantageous for at least one semiconductor switching element to be a thyristor.

In particular, there are numerous possibilities to configure and refine the method according to the invention for the operation of a pitch system of a wind turbine. In this context, reference is hereby made to the claims that are subordinate to claim 1 as well as to the detailed description provided below of preferred embodiments of the invention, making reference to the drawing.

DETAILED DESCRIPTION OF THE PREFERRED EMBODIMENTS

Figure 1:
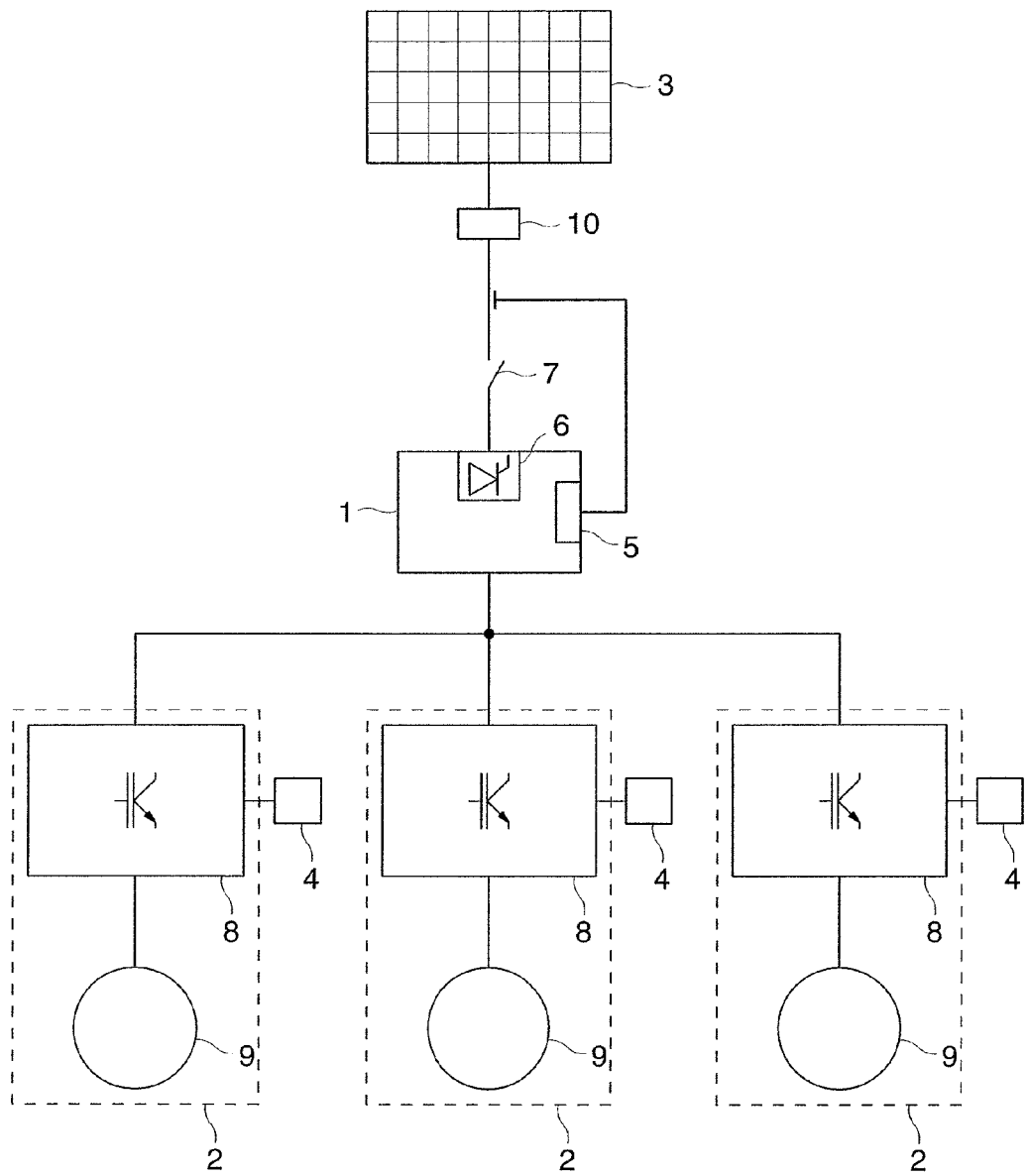
FIG. 1 schematically shows a pitch system for carrying out the method according to the invention in a preferred refinement of the invention.

FIG. 1 shows a pitch system with an input rectifier 1 and three pitch drives 2. The pitch drives 2 are able to drive the rotor blades of a wind turbine (not shown here). The input rectifier 1 is connected to a supply network 3 that can be, for example, the general power grid. The input rectifier 1 rectifies the three-phase alternating current that is supplied by the supply network 3 and makes it available to the pitch drives 2. Each of the pitch drives 2 is connected to an emergency power storage device 4. The pitch drives 2 can be supplied with electric power by the emergency power storage devices 4. Possible emergency power storage devices 4 are especially batteries or capacitors, here above all, so-called ultracaps. The input rectifier 1 has a supply voltage measuring device 5 that monitors the voltage of the supply network 3.

Furthermore, the input rectifier 1 has semiconductor switching elements 6 that are indicated in the figure by the switching symbol for thyristors and that are preferably made up of thyristors. The semiconductor switching elements 6 can block the flow of current from each phase of the three-phase alternating current supply from the supply network 3 into the input rectifier 1. There is also a mains contactor 7 arranged between the supply network 3 and the input rectifier 1. This mains contactor 7 can be used to disconnect the connection between the input rectifier 1 and the supply network 3.

The pitch drives 2 each have an inverter 8 and an electric pitch motor 9. Each inverter 8 is connected to the associated pitch motor 9 and supplies it with electric power. On the one hand, the pitch motors 9 can drive the rotor blades (not shown here) of the wind turbine directly, if applicable, making use of a gear. On the other hand, each of the pitch motors 9 can also drive a hydraulic pump of a hydraulic system, whereby the hydraulic system drives a rotor blade, for example, by means of a hydromotor or a hydraulically driven cylinder.

As soon as the supply voltage measuring device 5 detects that the voltage of the supply network 3 exceeds the first voltage value, the semiconductor switching elements 6 are switched into the blocking mode, thereby preventing a further flow of current from the supply network 3 into the input rectifier 1. In this manner, the pitch drives 2 are protected against overvoltage from the supply network 3. As long as the semiconductor switching elements 6 are switched to the blocking mode, the pitch drives 2 are supplied with electric power by the emergency power storage devices 4.

As soon as the voltage of the supply network 3 falls below a third voltage value, the semiconductor switching elements 6 of the input rectifier 1 are deblocked again. This deblocking does not take place if the semiconductor switching elements 6 had not previously been blocked for at least 250 milliseconds, but preferably for at least 500 milliseconds. However, if the voltage of the supply network 3 rises to such an extent that it exceeds a second voltage value, the mains contactor 7 is opened so that the pitch system is protected against this overvoltage. The status of the mains contactor 7 is emitted via a signal output (not shown here).

Furthermore, between the supply network 3 and the input rectifier 1, there is an overvoltage protection device 10 that especially dissipates the overvoltages that cannot be blocked by the semiconductor switching elements 6 because these overvoltages either occur too quickly or because they exceed the overvoltage resistance of the semiconductor switching elements 6.

The execution of the individual method steps can be carried out, for instance, by a computer program that is stored on a storage medium and that is processed by a control means of the pitch system.

Figure 2:
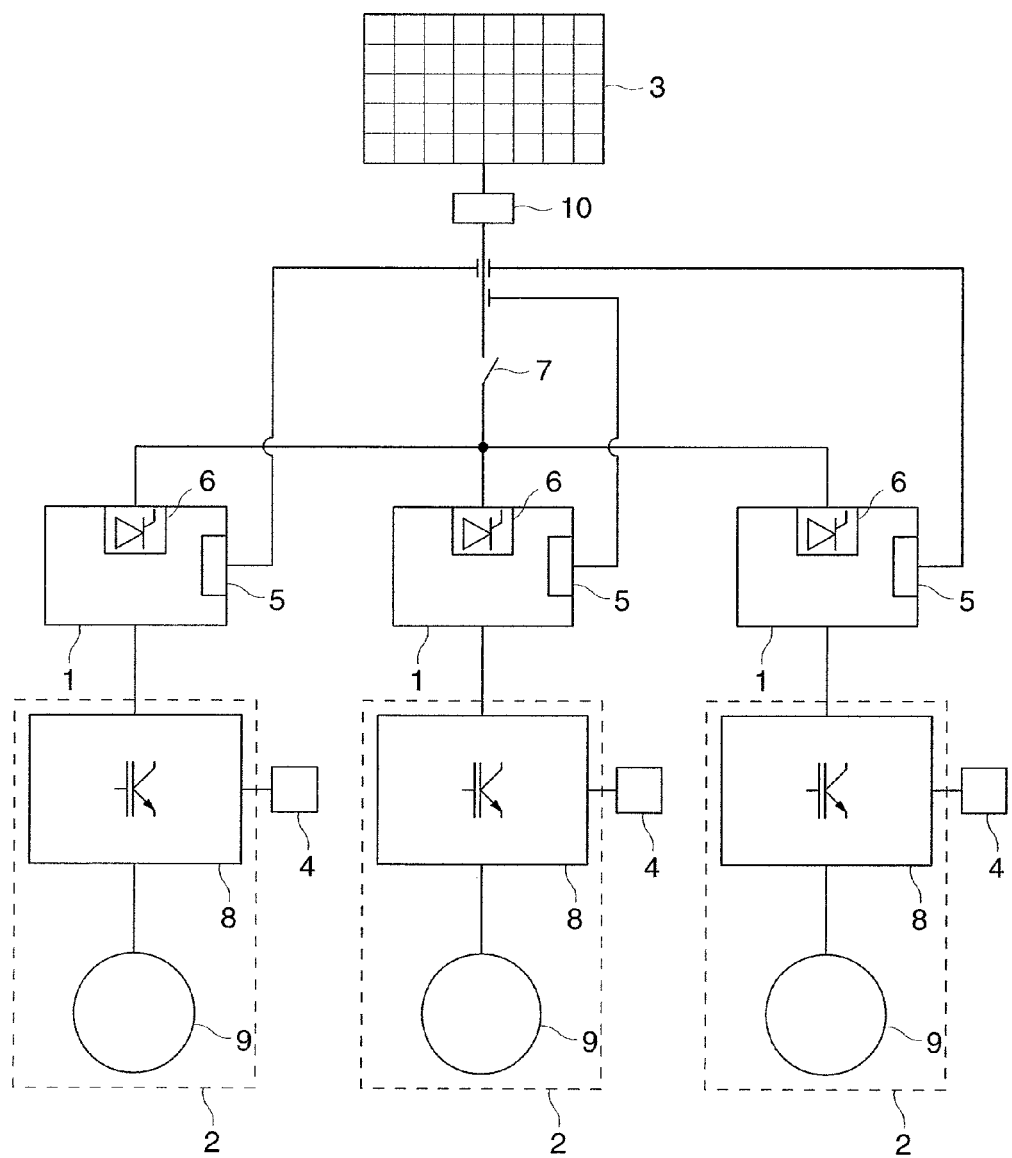
FIG. 2 schematically shows an alternative pitch system for carrying out the method according to the invention in another preferred refinement of the invention.

FIG. 2 shows an alternative embodiment of a pitch system for the implementation of the method according to the invention. In contrast to FIG. 1, this pitch system here does not have a central input rectifier 1 but rather three separate input rectifiers 1 that each supply a pitch drive 2 with electric power. Moreover, each input rectifier 1 has a supply voltage measuring device 5 for measuring the voltage of the supply network 3. When an overvoltage is detected by the supply voltage measuring devices 5, the semiconductor switching elements 6 of all of the input rectifiers 1 are switched into the blocking mode, so that all three pitch drives 2 are protected against the overvoltage. For the rest, the mode of operation of the method according to the invention is identical to the mode of operation described in conjunction with FIG. 1.

LIST OF REFERENCE NUMERALS 1 input rectifier
2 pitch drive
3 supply network
4 emergency power storage device
5 supply voltage measuring device
6 semiconductor switching element
7 mains contactor
8 inverter
9 pitch motor
10 overvoltage protection device

The invention claimed is:

1. A method for operating a pitch system of a wind turbine comprising the steps of:
providing a pitch system having at least one input rectifier and at least one pitch drive;
supplying each of the one or several input rectifiers with alternating current by a supply network;

supplying each of the one or several pitch drives with electric power by the one input rectifier or by at least one of the several input rectifiers;

connecting each of the one or several pitch drives to an emergency electrical power storage, whereby each of the one or several pitch drives can be supplied with electric power by the emergency electrical power storage that is connected to it;

providing each of the one or several input rectifiers with at least one semiconductor switching element with which a flow of current from the supply network into the respective input rectifier can be blocked;

measuring a voltage or several voltages of the supply network;

blocking the flow of current from the supply network into the respective input rectifier with the respective semiconductor switching element if the measured voltage of the supply network or a value calculated from the several measured voltages of the supply network exceeds a first voltage value;

supplying each of the one or several pitch drives with electric power by the emergency electrical power storage that is connected to it;

providing a mains contactor arranged in a connection between the supply network and the one or several input rectifiers;

disconnecting each of the one or several input rectifiers from the supply network by the mains contactor if the measured voltage of the supply network or a value calculated from the several measured voltages of the supply network exceeds a second voltage value that is greater than the first voltage value; and unblocking the flow of current into the respective input rectifier with the respective semiconductor switching element if the measured voltage of the supply network or a value calculated from the several measured voltages of the supply network falls below a third voltage value that is equal to or smaller than the first voltage value.

2. The method for the operation of a pitch system of a wind turbine according to claim 1, wherein an emergency procedure is initiated if at least one semiconductor switching element has been switched to a blocking mode for longer than a first time span.

3. The method for the operation of a pitch system of a wind turbine according to claim 1, wherein an emergency procedure is initiated if the measured voltage of the supply network or a value calculated from the several measured voltages of the supply network exceeds a second voltage value.

4. The method for the operation of a pitch system of a wind turbine according to claim 1, and further comprising the steps of disconnecting each of the one or several input rectifiers from the supply network by the mains contactor if at least one semiconductor switching element has been switched to a blocking mode for longer than a first time span.

5. The method for the operation of a pitch system of a wind turbine according to claim 1, wherein an emergency procedure is initiated if the electric power stored in the emergency electrical power storage falls below a predetermined threshold value.

6. The method for the operation of a pitch system of a wind turbine according to claim 1, and further comprising the step of maintaining a blocking of a flow of current from the supply network into the respective input rectifiers with the respective semiconductor switching element at least for a duration of a second time span before unblocking becomes possible.

7. The method for the operation of a pitch system of a wind turbine according to claim 6, wherein the second time span is at least 250 milliseconds.

8. The method for the operation of a pitch system of a wind turbine according to claim 7, wherein the second time span is at least 500 milliseconds.

9. The method for the operation of a pitch system of a wind turbine according to claim 1, and further comprising the steps of providing a digital signal output of the mains contactor and emitting a digital output signal from the digital signal output that indicates a switching status of the mains contactor.

10. The method for the operation of a pitch system of a wind turbine according to claim 1, wherein each of the one or several input rectifiers has a supply voltage measurement.

11. The method for the operation of a pitch system of a wind turbine according to claim 1, wherein at least one semiconductor switching element comprises a thyristor.

12. The pitch system of a wind turbine according to claim 1, wherein said emergency electrical power storage comprises a capacitor or a battery.

13. A pitch system of a wind turbine comprising:

at least one input rectifier;

at least one pitch drive supplied with electric power by the one rectifier or by at least one of several input rectifiers;

a supply network supplying the one or several input rectifiers with alternating current;

an emergency electrical power storage connected to the pitch drive such that the pitch drive can be supplied with electric power by the emergency electrical power storage;

the one or several input rectifiers comprising at least one semiconductor switching element configured and arranged to block a flow of current from the supply network into the respective input rectifier; and the at least one semiconductor switching element configured and arranged to block the flow of current from the supply network into the respective input rectifier if a measured voltage of the supply network or a value calculated from several measured voltages of the supply network exceeds a first voltage value;

a mains contactor arranged in a connection between the supply network and the one or several input rectifiers, the mains contactor configured and arranged to disconnect the one or several input rectifiers from the supply network if a measured voltage of the supply network or a value calculated from several measured voltages of the supply network exceeds a second voltage value that is greater than the first voltage value;

the at least one semiconductor switching element configured and arranged to unblock the flow of current from the supply network into respective input rectifier if a measured voltage of the supply network or a value calculated from several measured voltages of the supply network falls below a third voltage value equal to or smaller than the first voltage value;

whereby the pitch drive is supplied with electric power by the emergency electrical power storage.

14. The pitch system of a wind turbine according to claim 13, wherein the mains contactor is configured and arranged to disconnect the one or several input rectifiers from the supply network if the semiconductor switching element has been switched to a blocking mode for longer than a first time span.

15. The pitch system of a wind turbine according to claim 13, and further comprising a digital signal output of the mains contactor configured and arranged to emit a digital output signal that indicates a switching status of the mains contactor.

16. The pitch system of a wind turbine according to claim 13, wherein said at least one semiconductor switching element comprises a thyristor.

17. The pitch system of a wind turbine according to claim 13, wherein said emergency electrical power storage comprises a capacitor or a battery.

18. The pitch system of a wind turbine according to claim 17, wherein said capacitor comprises an ultracapacitor.

* * * * *